N. TESLA.
SPEED INDICATOR.
APPLICATION FILED DEC. 18, 1916.

1,274,816.

Patented Aug. 6, 1918.

Inventor
Nikola Tesla
By his Attorneys
Foree Bain & May

UNITED STATES PATENT OFFICE.

NIKOLA TESLA, OF NEW YORK, N. Y., ASSIGNOR TO WALTHAM WATCH COMPANY, OF WALTHAM, MASSACHUSETTS, A CORPORATION OF MASSACHUSETTS.

SPEED-INDICATOR.

1,274,816.

Specification of Letters Patent.   Patented Aug. 6, 1918.

Application filed December 18, 1916. Serial No. 137,691.

*To all whom it may concern:*

Be it known that I, NIKOLA TESLA, a citizen of the United States, residing at New York, in the county and State of New York, have invented certain new and useful Improvements in Speed-Indicators, of which the following is a full, clear, and exact description.

Among the desiderata of speedometer construction are these: that the torque exerted upon the secondary, or indication-giving, element shall be linearly proportional to the speed of the primary member rather than to the square of the speed (as instanced in centrifugal speedometers); that the torsional effect at low speeds shall be strong and steady so that particular delicacy of construction may not be necessary and that minute causes of theoretical errors (such as bearing-friction, spring-inequalities and the like) may be negligible in effect; that the torque may be substantially unaffected by changes of extraneous conditions, as of temperature, atmospheric density and magnetic influence; that the instrument be inherently dead-beat and relatively insensible to mechanical vibration; and that ruggedness, simplicity and economy, for attendant durability, manufacturing facility and low cost, be attained. My present speedometer realizes these advantages and provides, also, an appliance that is suitable for great, as well as very small, velocities, exact in its readings, uniformly graduated as to scale, and unaffected by changes of temperature or pressure within as well as without.

In my Patent No. 1,209,359, dated December 19, 1916, I have described a new type of speed measuring instrument wherein the adhesion and viscosity of a gaseous medium, preferably air, is utilized for torque-transmission from a primary driving to a secondary pivoted and torsionally restrained member under conditions such that the rotary effort exerted upon the latter is linearly proportional to the rate of rotation of the former. The principles of that invention find place in my present construction. Such "air drag" speedometers have been found capable of meeting satisfactorily the commercial requirements for both large and small instruments respectively adapted to measure relatively high and low speeds, but nevertheless it is true that although such instruments, when built for high-speed indication, may be of sturdy construction, they must, when designed for low-speed measurement, be built with great precision and delicacy. This because the inertia of the secondary element must be kept extremely small for desirable promptness of response to very slow starting speeds and consequent feebleness of the turning effort. In some instances, therefore, it is highly desirable to employ a transmitting medium giving a much greater torque than air with concomitant extension of the low-range of accurate speed reading, quickness of response, practicable decrease of size of parts and lessening of sensitiveness to disturbances such as vibration of the instrument as a whole.

All of the stated objects I accomplish by employing as the torque-transmitting medium between the driving and driven elements a body of suitable liquid, (*e. g.*, mercury) under conditions (as set forth in my prior application referred to) proper to secure linear proportionality of deflections, and, further, by making provision automatically to compensate for the changes in the viscosity of the liquid that accompany variations of temperature. The latter equipment is unnecessary in my air-drag speedometer, but mercury and other liquids of relatively great density that might be employed for my present purposes have not the quality of approximate self-compensation for temperature changes that inheres in air, owing to the fact that the viscosity of such a liquid decreases rapidly as its temperature rises, and so to a successful "mercury-drag" instrument temperature compensation is requisite.

The underlying ideas of this invention can be carried out in various ways and are capable of many valuable uses, but for purposes of disclosure, specific reference to a form of speed indicator designed for use on an automobile is adequate.

As in the structure described in my stated prior application, I provide driving and driven members with confronting, closely-adjacent, non-contacting, smooth, annular friction surfaces, co-acting for transmission of torque through the viscosity and adhesion of interposed thin films of a suitable medium—in this case mercury—under conditions to prevent free exchange of fluid acting on the system, to prevent its local circulation and eddying, to maintain its flow calm and non-turbulent, and to secure as low velocity of the medium with respect to the system as the circumstances of the case may make desirable. These conditions all aid in the attainment of rigorous linear proportionality of deflection of the secondary to the speed of rotation of the primary element under given temperature conditions. Additionally, by suitable construction I make it possible to obtain a nearly perfect compensation for temperature changes so that the deflections may be rigorously proportionate to speed within limits of temperature variation wider than I believe likely to occur in the practical use of the instrument. I attain this compensatory result by providing thermo-responsive means to vary the effective area of the secondary element upon which the medium acts in approximately inverse proportion to temperature-effected changes of viscosity of the medium, and as a preferred specific means to this end, I dispose a body of the liquid beyond, but communicating with, the active portion of the liquid medium and of such quantity that, in effectively the same measure as viscosity and, consequently, the torque is diminished or increased with temperature changes, the active liquid-contacting area of the secondary member is enlarged or reduced owing to the expansion or contraction of the fluid.

In the drawing Figure 1 is a top view of a speedometer;

Figure 4:
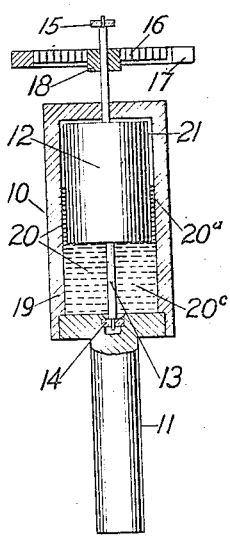
Fig. 4 and Fig. 5 are diagrams explanatory of the compensating principle.

In Fig. 4 the primary or driving member is a cup 10 carried by a freely rotatable vertical shaft 11. Within it the cylinder-formed secondary member 12 is mounted on a spindle 13, journaled in jewels 14 and 15 of negligible friction, for pivotal displacement against the restraint of a spiral spring 16, connected at its ends respectively to fixed support 17 and spindle-collar 18, so that by pivotal displacement of the secondary cylinder against the resisting spring tension, the torsional effort exerted on the secondary member may be measured. The spring is such that its displacements are linearly proportionate to the force applied. The lower portion 19, of the cup-chamber is a reservoir filled with the liquid, 20, as mercury, and the liquid normally extends part way up the very narrow interspace 21 between the two elements to contact with less than the whole of their confronting friction surfaces. With mercury as the medium, in an instrument with a secondary cup of one inch diameter I find an interspace-width of 0.05 inch to be satisfactory.

It will now be seen that when shaft 11 is rotated the mercury in the cup is entrained and in turn produces a drag upon the pivoted member 12, the torsional effort being directly proportionate to the active area, viscosity of the fluid and the speed of rotation and, inversely, to the width of the interspace 21 or distance between the rotated and pivoted surfaces. If $v$ be coefficient of viscosity, $A$ the active area, $s$ the speed and $d$ the distance between the juxtaposed rotating and pivoted surfaces, all of the quantities being expressed in proper units, then the twisting force $$F = \frac{vAs}{d} \text{ dynes.}$$

When, through changes in the external conditions or work performed on the fluid, the temperature of the same is raised, two effects, separate and distinct, are produced. In the first place, the viscosity is diminished according to a certain law, reducing correspondingly the torque, on the other hand, the fluid expands thereby enlarging the areas of the active, or liquid-contacting, surfaces of the elements with an attendant increase of rotary effort. Obviously, then, if it is possible so to relate these actions that they mutually annul each other upon any change of temperature, a complete compensation may be obtained. This result, I have ascertained, can be almost perfectly realized with a liquid, as mercury, by properly proportioning the volume of the chamber-contained, or compensating, component $20^c$ of the liquid and the component $20^a$ of the liquid in the interspace 21. With a view to simplifying this explanation, be it supposed that the force F is wholly due to the liquid component $20^a$ (the drag exerted on the bottom face of cylinder 12 being assumed to be negligible and the bearings to be frictionless). It will be evident that under these conditions the active area will increase as the volume of the fluid. Perfect compensation would require that upon a rise of temperature, the active area, and therefore the torsional effort, be augmented in the same ratio as viscosity is diminished. In other words, the percentage of decrease of viscosity divided by that of increase of area should be the same for all temperatures. Attention is called to the table below showing that, with mercury as the medium, the value of this fraction at ordinary temperatures is about, or not far from, 20.

| Temperature C. | Volume of fluid. | Viscosity of fluid. | Percentage of increase of V. | Percentage of decrease of v. | Value of ratio. |
|---|---|---|---|---|---|
| T | V | v | a | b | $\frac{b}{a}$ |
| −20 | 0.996364 | 0.018406 | −0.3636 | −8.2718 | 22.75 |
| −15 | 0.997273 | 0.018038 | −0.2727 | −6.1029 | 22.38 |
| −10 | 0.998182 | 0.017681 | −0.1818 | −4.0074 | 22.04 |
| −5 | 0.999091 | 0.017335 | −0.0909 | −1.9722 | 21.70 |
| 0 | 1.000000 | 0.017000 | 0 | 0 | 21.35 |
| 5 | 1.000909 | 0.016663 | 0.0909 | 1.9107 | 21.02 |
| 10 | 1.001818 | 0.016361 | 0.1818 | 3.7603 | 20.68 |
| 15 | 1.002727 | 0.016057 | 0.2727 | 5.5505 | 20.35 |
| 20 | 1.003636 | 0.015762 | 0.3636 | 7.2706 | 20.00 |
| 25 | 1.004546 | 0.015477 | 0.4546 | 8.9564 | 19.70 |
| 30 | 1.005455 | 0.015202 | 0.5455 | 10.5750 | 19.38 |
| 35 | 1.006365 | 0.014937 | 0.6365 | 12.1410 | 19.07 |
| 40 | 1.007275 | 0.014680 | 0.7275 | 13.6470 | 18.75 |
| 45 | 1.008185 | 0.014433 | 0.8185 | 15.1031 | 18.45 |
| 50 | 1.009095 | 0.014194 | 0.9095 | 16.5073 | 18.15 |

This means to say that if the total volume of the liquid is twenty times that contained in the interspace between the elements, the two opposite effects, one increasing and the other reducing, the torque, will approximately balance. This fact is borne out by practical tests and measurements, which have demonstrated that by constructing for this volumetric ratio deflections very closely proportionate to the speed are obtained through a range of temperature variations far greater than ordinarily occurring. For commercial purposes it is quite sufficient to employ a ratio of approximately the stated value as the error involved in a small departure therefrom is inconsiderable. When necessary or desirable, greater precision can be obtained by taking into account four secondary effects, due to expansion or contraction of the walls, which slightly modify the torque; first, changes in the volume of the reservoir; second, in the distance between the opposed surfaces; third, in active area and, fourth, in velocity. Increase in the former two tend to diminish, the latter to augment, the viscous drag. A satisfactory ratio in a cylindrical type of instrument has been found to be about 24.

Figure 5:
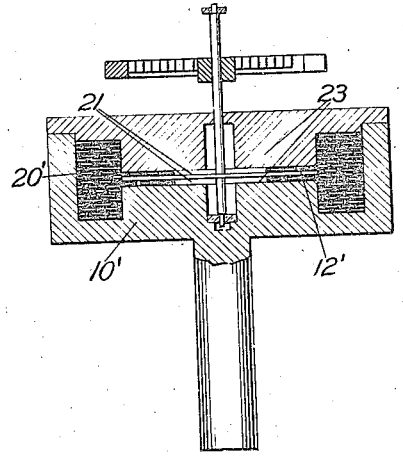

Fig. 5 illustrates a different arrangement, exemplifying the same principle of employing a reservoir-contained liquid body as the thermo-responsive means to compensate for viscosity changes of the active liquid. In this case a spindle-carried disk 12' serves as a secondary element, while the primary member consists of a hollow shell 10' with annular surfaces 23 confronting the disk surfaces and encompassed by an annular chamber 20', so that under rotation the mercury body fills the chamber and occupies peripheral portions of the interspaces 21 between the flat confronting surfaces. It is hardly necessary to remark that since there are two such interspaces 21, the calculation of capacity of the reservoir or chamber 20', beside considering the form of the device, must take account of the active mercury body in both interspaces.

Figure 1:
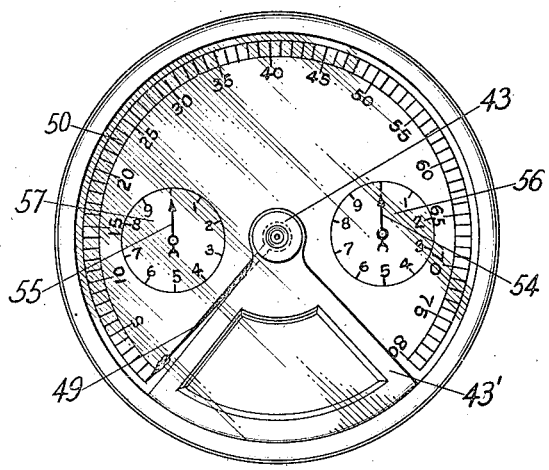
Figure 3:
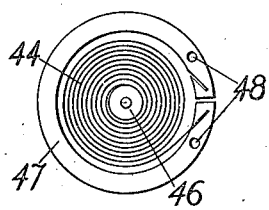
Fig. 3 shows a spring adjusting arrangement.
Figure 2:
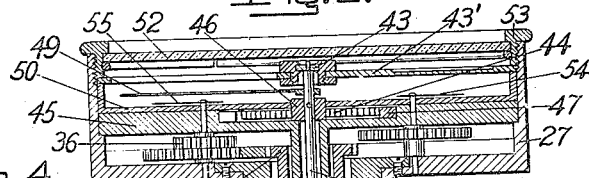
Fig. 2 is a central vertical section therethrough.

In Figs. 1 to 3 a complete commercial instrument embodying my invention is shown. Specifically, 25 is a tube threaded at 26 and carrying at the top a casing head 27 the whole forming a housing for inclosure of the moving parts. The driving shaft 28 carries a cylindrical cup 29 in the bottom of which is screwed a plug 30, turned down as 31 for the purpose of providing the reservoir 32. The cup 29 is closed at its upper end by a tight fitting cover 33, having an upwardly extending shank 34, carrying a pinion 35 to drive suitable wheelwork 36 of the odometer contained in the lower part of the head 27. This structure, providing the primary element, is rotatable in ball-bearings 37 and 38 fixed in tube 25 and adjustable by means of nuts 39.

The secondary element is made of a very thin metal cup 40, inverted and secured to slender spindle 41 mounted in jeweled bearings 42 and 43, respectively carried in a cavity of plug 30 and by a frame arm 43'. A running bearing 42 can usually be employed without detriment, but a fixed bearing may be used if desired. The weight of the secondary member with its movable attachments should be so determined that the upward thrust against jewel 43 is very slight. The torsional twist of secondary cup 40 is resisted by a spiral spring 44 lodged in a turned recess of a frame plate 45, having one of its ends connected to collar 46 fast on the spindle 41 and the other to a split ring 47 spring-gripping the wall of the recess in plate 45. By inserting pincers in holes 48 (Fig. 5) and contracting the ring it is freed sufficiently for adjustment to bring the spindle-carried indicator 49 to point to zero of the graduated scale 50 that, if all of the principles of my invention are best embodied, may be made uniformly graduated. The scale is carried on plate 45 and, together with the support 43', is held in place by a rim 53 that suitably carries the glass cover 52. The odometer may have any suitable number of indicating elements of different orders suitably geared, the two hands 54 and 55 sweeping over graduated dials 56 and 57, typifying any suitable construction.

It will be apparent that the high torque at low speed developed through the mercurial transmitting medium makes the instrument very effective as one for use on automobiles, and while it is true that with a heavy fluid, as mercury, the range of velocity of the medium throughout which proportionality of torque to speed, under the described conditions, is rigorously linear falls below the range available where air is the medium, a construction presenting the friction surfaces of the elements in a cylinder-form as suggested in Figs. 2 and 4 permits of the use of a suitably constructed device with a small-diameter secondary to measure very high speeds without imparting to the medium a linear velocity beyond its stated range. For the successful use of mercury in the present described instrument (or other rotary devices) it is important that the mercury be pure, the surfaces contacting therewith smooth, clean and nongranular (preferably nickel-plated or made of non-corrosive, high grade steel) to minimize abrasion and keep the mercury clean, and that the linear velocity of the mercury be kept low, preferably below six feet per second, in order that it may not break up into minute droplets or apparently-powdered form.

What I claim is:

1. In combination, driving and driven elements, having opposed, closely-adjacent, non-contacting friction surfaces; a liquid body interposed between active areas thereof through which the driving element frictionally drags the driven one and thermo-responsive means for varying the active area of the secondary in approximately inverse proportion to the thermo-effected variations in viscosity of the liquid.

2. In a temperature-compensating speed indicator, the combination of variable speed primary and movement-restrained secondary elements that are suitably supported for separate movement and have opposed friction surfaces in close but non-contacting juxtaposition; an interposed liquid body contacting normally with active areas of said surfaces less than the whole thereof, and thermo-responsive means for varying the liquid-contacting areas of said elements approximately inversely to the thermo-effected variations of liquid viscosity.

3. In a temperature-compensating speed indicator, the combination of variable speed primary and movement-restrained secondary elements that are suitably supported for separate movement and have opposed closely-adjacent non-contacting friction surfaces; an interposed liquid body and thermo-responsive means for varying the active areas of said surfaces in predetermined proportion to thermally-effected changes of liquid viscosity.

4. In a temperature-compensating speed indicator, the combination of variable speed primary and movement-restrained secondary elements that are suitably supported for separate movement and have opposed closely-adjacent non-contacting friction surfaces; a liquid body partially filling the interspace between said surfaces, and thermo-responsive means for varying the liquid quantity within in said interspace in predetermined inverse ratio to thermo-effected changes of liquid viscosity.

5. The combination with driving and driven elements having opposed, closely-adjacent, non-contacting friction surfaces and an interposed liquid body contacting with active portions thereof, of a compensating liquid body communication with the said interposed or active one, and proportioned to vary the effective contact area of the active liquid approximately inversely to its temperature-effected viscosity changes.

6. The combination with freely movable driving and movement-resisted driven elements, having friction surfaces in opposed, closely-adjacent non-contacting relation, of means providing a reservoir, communicating with the interspace between said elements, and a liquid body having a reservoir-filling component and an active torque-transmitting component that normally, partly occupies said interspace, these components proportioned volumetrically for temperature-effected change of the contact area of the active component in approximately inverse ratio to the attendant changes of liquid viscosity.

7. In a temperature-compensating speed indicator, the combination of a freely rotatable cylindrical cup; a cylinder-formed member in the upper portion thereof, pivoted and spring-restrained; and a body of mercury filling the reservoir-portion of the cup below the pivoted member and extending partially in the narrow interspace between the cup and cylinder.

In testimony whereof I affix my signature.

NIKOLA TESLA.